United States Patent
Fard et al.

(10) Patent No.: US 8,938,037 B1
(45) Date of Patent: Jan. 20, 2015

(54) HIGH SPEED GAIN AND PHASE RECOVERY IN PRESENCE OF PHASE NOISE

(71) Applicant: PMC-Sierra US, Inc., Sunnyvale, CA (US)

(72) Inventors: Saeed Fard, Calgary (CA); Sean Gibb, Calgary (CA); Peter Graumann, Calgary (CA); Siavash Sheikh Zeinoddin, Ottawa (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/798,970

(22) Filed: Mar. 13, 2013

(51) Int. Cl.
*H04L 27/08* (2006.01)
*H04L 1/00* (2006.01)

(52) U.S. Cl.
CPC .................... *H04L 1/0036* (2013.01)
USPC ........... 375/345; 375/234; 375/229; 375/231; 375/232; 375/233

(58) Field of Classification Search
CPC ............ H04L 27/3818; H04L 27/0014; H04B 10/6165
USPC .................. 375/345, 234, 229, 231, 232, 233
See application file for complete search history.

(56) References Cited

U.S. PATENT DOCUMENTS

| 5,940,451 | A * | 8/1999 | Kim .............................. 375/345 |
| 6,236,343 | B1  | 5/2001 | Patapoutian |
| 7,978,795 | B2* | 7/2011 | Currivan et al. ............. 375/345 |
| 8,258,877 | B2* | 9/2012 | Goel et al. ..................... 331/1 R |
| 2010/0061488 | A1* | 3/2010 | Endres et al. ................. 375/326 |
| 2012/0155890 | A1 | 6/2012 | Zhou et al. |

FOREIGN PATENT DOCUMENTS

| EP | 1942622  | 7/2008  |
| WO | 00/70767 | 11/2000 |

OTHER PUBLICATIONS

Lee et al., "New phase-locked loop design: understanding the impact of a phase-tracking channel detector," IEEE Transactions on Magnetics, vol. 46, No. 3, pp. 830-836, Mar. 2010.

Olcer et al., "Compensation of PLL Loop Delay in Read Channels for Tape Storage Systems," In proceedings of IEEE GLOBECOM 2009, pp. 1-5, Dec. 2009.

(Continued)

*Primary Examiner* — Qutbuddin Ghulamali
(74) *Attorney, Agent, or Firm* — Dennis R. Haszko

(57) ABSTRACT

A circuit for reducing phase errors in a digital communication systems signal is provided. The circuit comprises a demodulator block, a feed-forward path, a feed-back path, and a slicer. The demodulator block generates a plurality of samples from the signal and determines for each sample a corresponding phase error. The feed-forward path is configured to reduce in the signal a high frequency component of the phase errors. The feed-back path configured to reduce in the signal a low frequency component of the phase errors. The slicer selectively forwards phase errors to the feed-forward path or the feed-back path based on a respective magnitude of the phase error when operating in a decision-directed mode.

3 Claims, 11 Drawing Sheets

(56) References Cited

OTHER PUBLICATIONS

Ip et al., "Feedforward Carrier Recovery for Coherent Optical Communications", Journal of Lightwave Technology, vol. 25, No. 9, Sep. 2007, pp. 2675-2692.

Bhatti et al., "Feedforward Data-Aided Phase Noise Estimation from a DCT Basis Expansion", EURASIP Journal on Wireless Communications and Networking, vol. 2009, Aricle ID 568570, 11 pages, 2009.

* cited by examiner

HIGH SPEED GAIN AND PHASE RECOVERY IN PRESENCE OF PHASE NOISE

FIELD

The present disclosure relates generally to communications systems. More particularly, the present disclosure relates to noise reduction in electrical oscillators used as communications system frequency sources.

BACKGROUND

Electronic communications systems commonly rely upon an accurate frequency source or reference clock which typically takes the form of an oscillator. The performance of such systems is dependent upon the accuracy of the oscillator. In digital communications, frequency source inaccuracy tends to result in increased bit error rates. There is, therefore, a continuing need for ever-increasing accuracy of frequency source oscillators.

While an ideal oscillator generates a pure periodic waveform (e.g., a pure sinusoid), practical oscillator signals tend to be noisy including both amplitude noise and phase noise. Phase noise is the phenomenon of random fluctuation in the oscillator phase caused in part by thermal variation. While oscillator phase fluctuations in digital clock generation are usually referred to as "jitter," the general term "random phase" is commonly used for changes in radio-frequency oscillators.

By way of example, FIG. 1 shows a constellation diagram 100 illustrating the effect of −15 dBc phase noise on a quadrature phase-shift keying (QPSK) signal over additive white Gaussian noise (AWGN) channel with 30 dB signal-to-noise ratio (SNR).

In wireless communications systems characterized by lower data-rate and carrier frequency, phase noise issues do not necessarily cause significant performance degradations. With advances in data-rate, however, and utilization of higher frequency bands (e.g., the 60 GHz ISM band), phase noise issues have become a limiting factor in system performance.

Orthogonal frequency division multiplexing (OFDM) systems have traditionally been used for high data rate wireless communication. Due to OFDM's high sensitivity to phase noise, however, single-carrier (SC) communication with frequency-domain equalization (SC-FDE) is a useful method when transmitting data with high phase noise levels.

Phase noise in SC systems has traditionally been compensated by the use of an analog or digital phase-locked loop (PLL) circuit. A digital PLL (DPLL) circuit can significantly reduce the phase noise levels in low sample rate SC systems. Moreover, DPLL circuits are particularly effective against phase noise in traditional lower carrier frequency wireless systems (e.g., phase noise levels below −25 dBc).

For example, FIG. 2 shows a simplified schematic diagram of a known ideal second order type-II DPLL circuit 200. In this DPLL 200, the estimated phase error is used to predict the future phase error using a second order proportional-integral (PI) controller. FIG. 3 shows a constellation diagram 300 illustrating the effectiveness of the ideal DPLL in compensating the phase noise (wherein a WiGig IEEE 802.11ad system model is used for signal generation).

Effective implementation of a DPLL for phase noise cancellation can be challenging, however. Specifically, sufficient clock cycle budget is required for the DPLL to perform all of its error estimation, PI phase noise prediction, and cancellation. As long as all of the DPLL operations can be performed in one symbol cycle, the DPLL can provide its ideal performance.

By way of example, FIG. 4 shows a simplified schematic diagram of a DPLL circuit 400. The DPLL circuit 400 is similar to the DPLL circuit 200 shown in FIG. 2, but with indicators added illustrating the required clock cycles for each component of the DPLL 400. In each instance, the number of clock cycles required for a particular component in the circuit is designated by D#, where # is the number of clock cycles. In a typical implementation, phase error estimation can be performed in three clock cycles (coordinate rotation digital computer (CORDIC)+modulation slicer), the PI controller would require one clock cycle, complex sine/cosine requires one clock cycle, and a complex multiplication can be performed in one clock cycle. Therefore six clock cycles are required to perform all of the operations of a DPLL. As long as the symbol period is longer than six clock cycles, the DPLL 200 shown in FIG. 2 can effectively reduce the phase noise. This may not be the case, however, in high data rate systems.

For example, in a sample implementation of the IEEE 802.11ad (WiGig) system, the input data arrives at 1760 MS/Sec on a 220 MHz clock, i.e. eight samples per clock cycle. In this case, the effects of the block latencies and symbol period can be modeled in the DPLL as $D_{total}=6*8=48$ sample delay in the loop as shown in FIG. 4. This total delay is represented figuratively in FIG. 4 as $z^{-D_{total}}$ in block 410. This delay perturbs the DPLL response and significantly reduces its bandwidth hence impairing its effectiveness against the fast changing phase noise as shown in the constellation diagram 500 in FIG. 5.

Several authors have proposed methods for compensating PLL loop delay. See, for example: J. Lee et al., *"New phase-locked loop design: understanding the impact of a phase-tracking channel detector,"* IEEE Transactions on Magnetics, pp. 830-836, March 2010; S. Ölçer and E. Eleftheriou, *"Compensation of PLL Loop Delay in Read Channels for Tape Storage Systems,"* In proceedings of GLOBECOM '09, pp. 1-5, December 2009; and A. Patapoutian, *"Loop latency compensated PLL filter,"* U.S. Pat. No. 6,236,343 B1, May 2001. These references propose compensating the PLL loop response by introducing extra delay in the PLL loop in various forms. This extra delay slows down the PLL response, however, and reduces the PLL's ability to track fast-changing phase noise making it even less effective.

Further proposed methods which do not overcome all of the disadvantages described above are taught in United States Patent Application Publication No. US 2012/0155890 A1, U.S. Pat. No. 8,258,877, and WIPO International Patent Publication No. WO 2000/070767.

There remains a need, therefore, for an effective method to compensate for phase noise distortions in high sample rate communication systems. The method should be robust enough to work effectively with the circuit delays necessary to make ASIC implementation feasible.

Moreover, automatic gain control (AGC) functionality is required in communication systems for correct de-mapping of the received samples. It would be advantageous for AGC operation to be paired with phase noise and residual frequency offset compensation for improved performance and reduced complexity.

BRIEF DESCRIPTION OF THE DRAWINGS

Embodiments of the present invention will now be described, by way of example only, with reference to the attached Figures, wherein.

DETAILED DESCRIPTION

Figure 1:
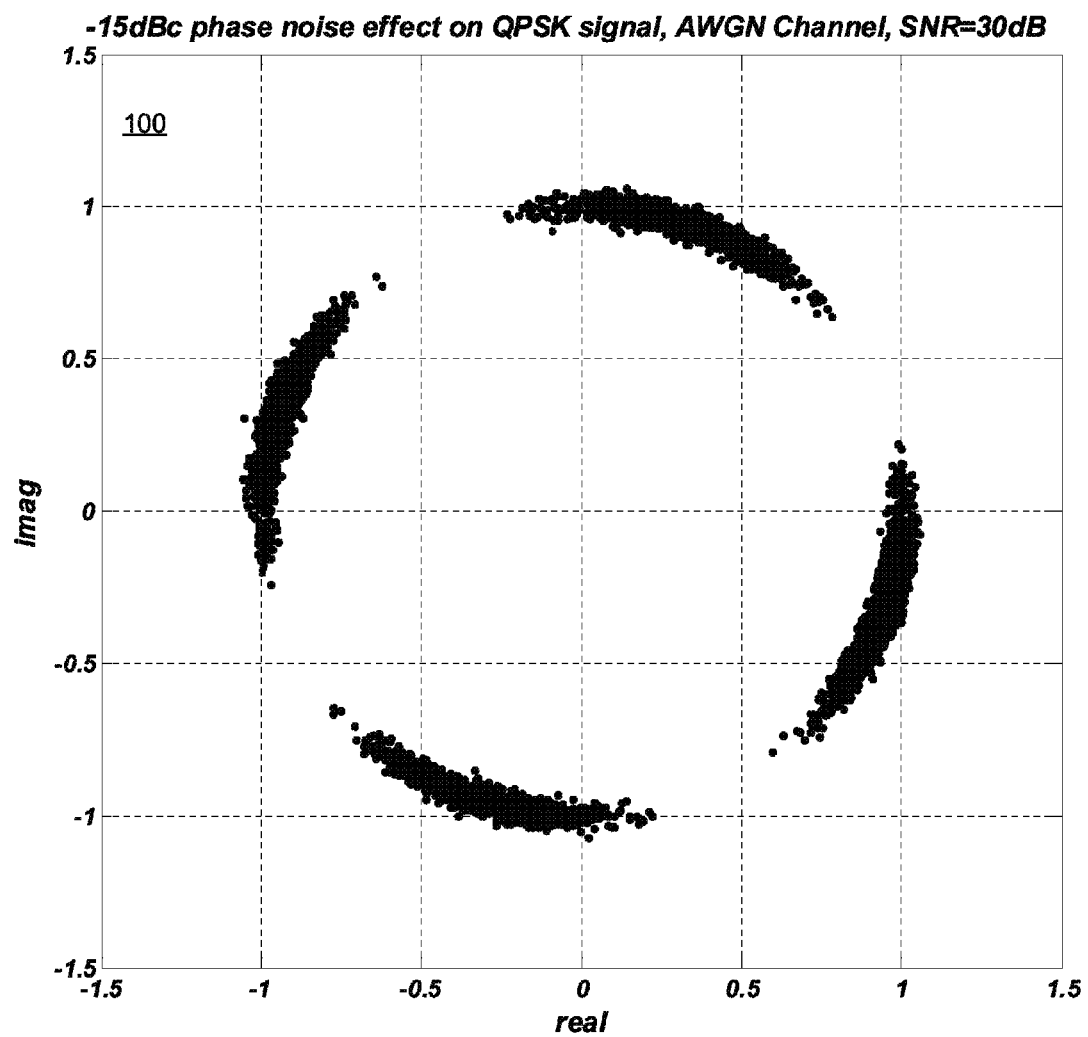
FIG. 1 shows a constellation diagram illustrating the effect of −15 dBc phase noise on a QPSK signal over AWGN channel with 30 dB SNR.
Figure 2:
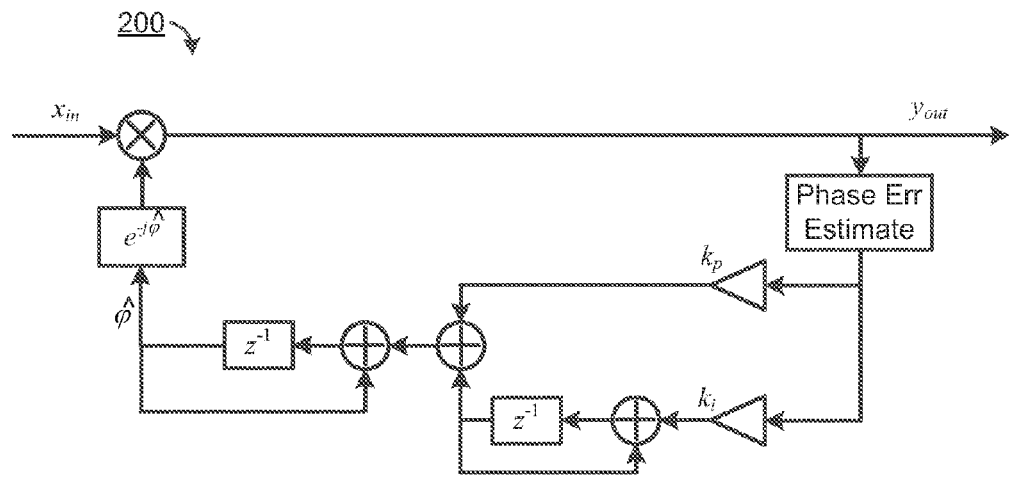
FIG. 2 shows a simplified schematic diagram of a known ideal second order type-II DPLL circuit.
Figure 4:
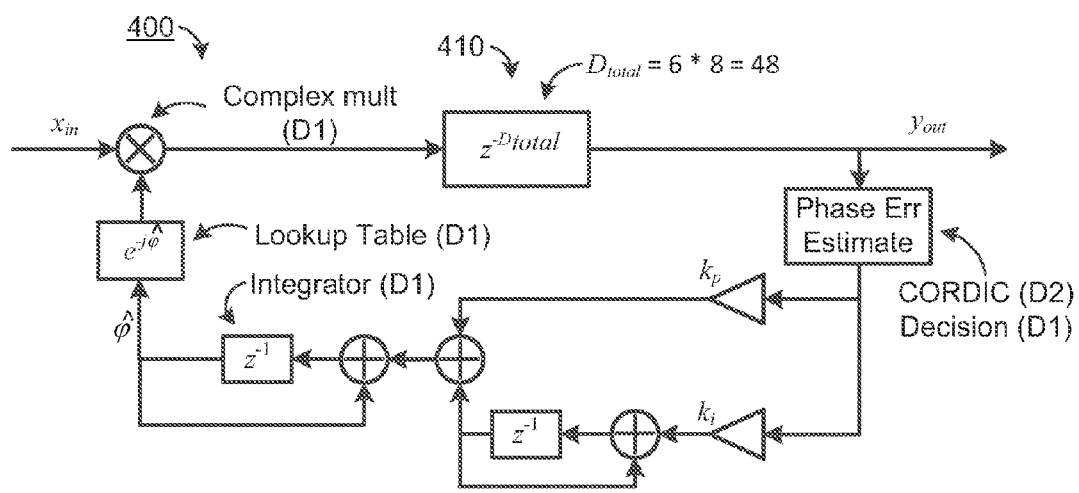
FIG. 4 shows a simplified schematic diagram of the known DPLL circuit of FIG. 2 illustrating delays of the components.
Figure 3:
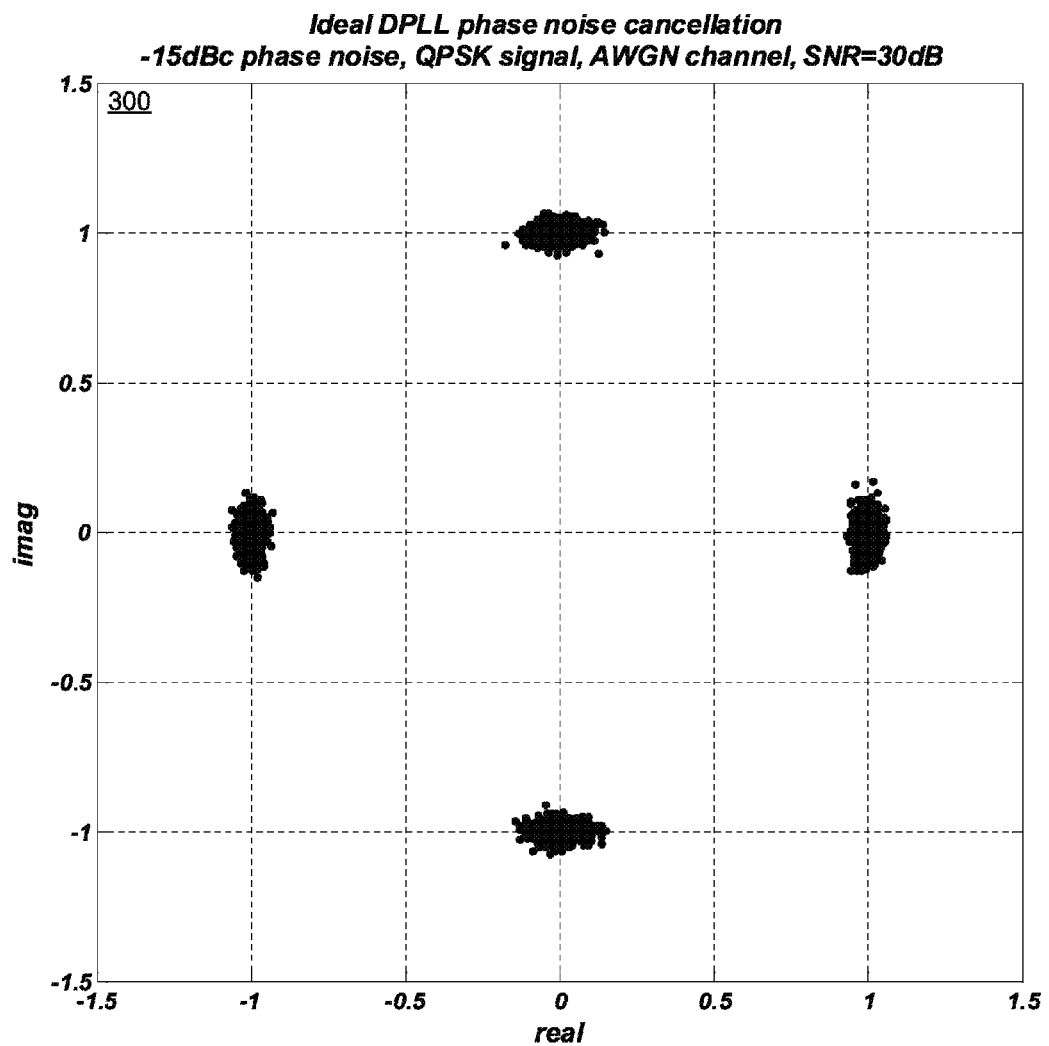
FIG. 3 shows a constellation diagram illustrating the phase noise cancellation effect of the DPLL of FIG. 2.
Figure 5:
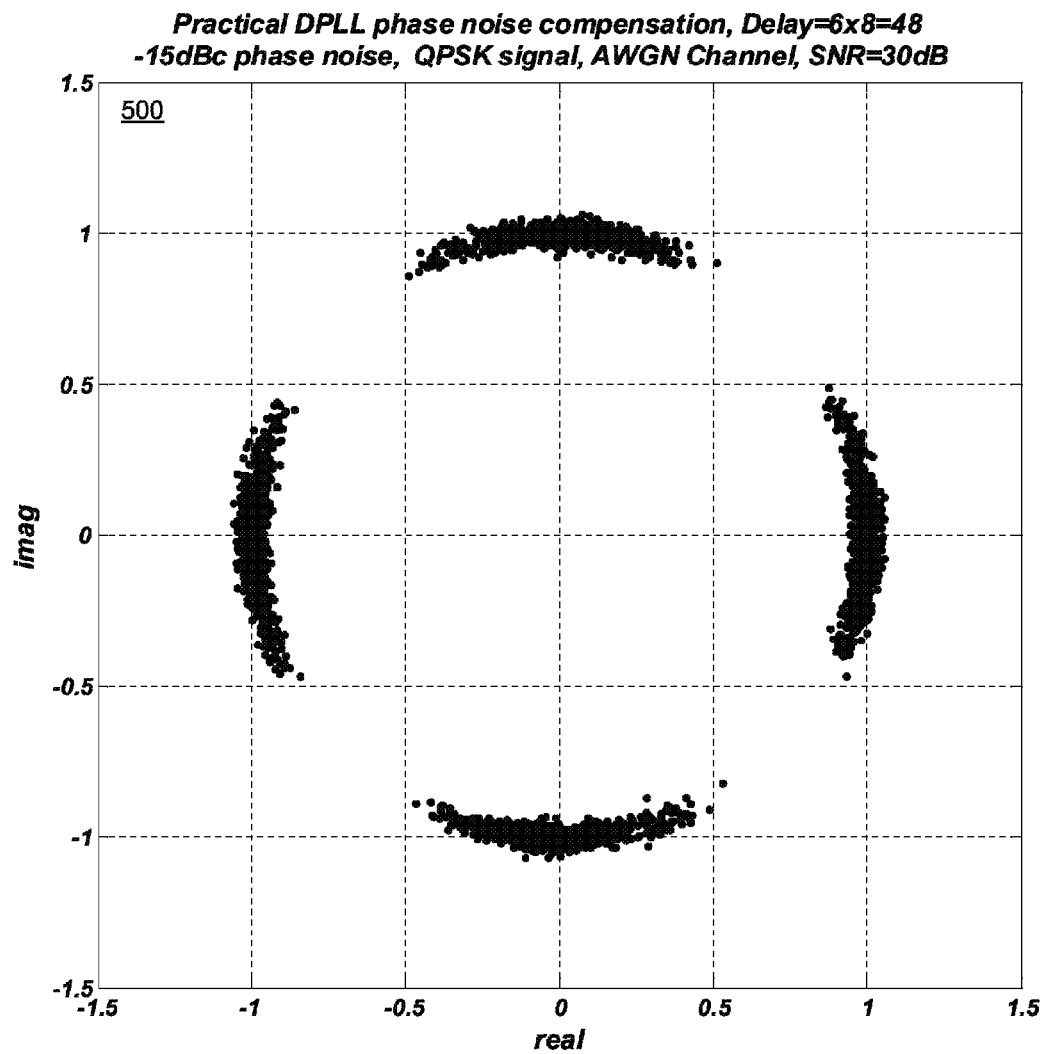
FIG. 5 shows a constellation diagram illustrating the practical phase noise cancellation effects of the DPLL's of FIGS. 2 and 4.

Effective compensation of phase noise distortions in high sample rate communication systems may be achieved by the use of an automatic gain and phase control (AGPC) block as described herein. The AGPC enables low power and low cost radio frequency (RF) frontend design by providing digital compensation for analog phase noise impairment. The AGPC compensates for gain and phase impairments that arise in antecedent digital and analog receiver blocks in high speed receivers. More specifically, the AGPC block fine tunes the signal gain and phase such that the received constellation points match those expected by the demapper. In the process, the AGPC block provides compensation for gain mismatch, residual frequency offset, and transmitter and receiver phase noise.

Ordinarily, a DPLL is used in signal carrier receivers for phase noise tracking and residual frequency offset compensation. Although effective against residual frequency offset, a traditional DPLL cannot provide enough phase noise compensation in high sample rate receivers, especially in systems having multiple samples per clock cycle. Moreover, high-sample rate receivers require higher bandwidth which is mostly available in higher frequency bands (e.g., 60 GHz ISM band). On the other hand, low power and low cost implementation of high frequency radio oscillators have higher phase noise problems which make signal reception even more challenging.

To solve this problem, the task of phase noise estimation and compensation may be divided into two stages: a first stage for estimating and compensating low frequency components of phase noise such as oscillator drift, and a second stage for estimating and compensating more rapidly changing phase noise components.

As used herein, "channel noise" or "channel noise component" in reference to a measured sample are intended to denote rapidly changing amplitude and phase fluctuations originating from addition of random values to the received signal, either in the wireless medium or the electronics. While phase noise is the result of random fluctuation in the oscillator phase, channel noise is mostly due to thermal noise of the electronic components. As used herein, "low frequency component", "frequency offset", or "frequency offset component", or "oscillator drift" in reference to a phase error of a measured sample are intended to denote slowly varying phase changes that may be referred to as a low frequency phase noise component (LFPNC). As discussed above, frequency offset or oscillator drift are often caused by oscillator bias or a mismatch between the transmitted and receiver oscillator frequencies which manifests over time as a gradual drifting of the sample phase. As used herein, high frequency phase noise component (HFPNC) in reference to a phase error of a measured sample is intended to denote rapid changes of the signal phase due to phase noise. High frequency phase noise component manifests itself in rapid changes of phase error between subsequent samples.

In a first aspect, a circuit for reducing phase errors in a phase-shift keyed communications signal is provided. The same approach can be taken for reducing phase noise with other digital modulations. The circuit comprises a demodulator block, a feed-forward path, a feed-back path, and a slicer. The demodulator block generates a plurality of samples from the signal and determines for each sample a corresponding phase error. The feed-forward path is configured to reduce the effects of HFPNC. The feed-back path configured to compensate for the LFPNC. The slicer selectively forwards phase errors to the feed-forward path or the feed-back path based on a respective magnitude of the phase error when operating in a decision-directed mode.

In a further aspect, each sample is either a payload sample or a non-payload sample. The demodulator block estimates the phase error corresponding to each of the payload samples in the decision-directed mode. The demodulator block determines the phase error corresponding to each of the non-payload samples in a data-directed mode. In an aspect, the demodulator block is further configured to adjust a gain of the signal based on a measured magnitude of at least one of the non-payload samples. In a yet further aspect, the demodulator block adjusts the gain of the signal in step sizes, wherein for at least one packet in the signal the step sizes are maximized for at least one initial non-payload sample in the packet, and wherein the step sizes are minimized for a first payload sample and all follow samples in the packet.

In a further aspect, the feed-back path is configured to model the LFPNC as a random-walk process. In an aspect, step sizes in the random-walk process are kept at a minimum when based on phase errors corresponding to payload samples, and the step sizes are decreased from a maximum when based on phase errors corresponding to at least a subset of non-payload samples.

In a further aspect, the slicer is configured selectively to forward phase errors to the feed-forward path or the feed-back path when operating in the decision-directed mode based on a preconfigured decision map. In an aspect, the slicer is configured to forward phase errors to the feed-forward path and to refrain from forwarding the phase errors to the feed-back path when the respective magnitude of the phase errors falls within a first phase error range. The slicer is further configured to forward the phase errors to the feed-forward path and the feed-back path when the respective magnitude of the phase errors falls within a second phase error range different from the first phase error range. The slicer is further configured to refrain from forwarding the phase errors both to the feed-forward path and the feed-back path when the respective magnitude of the phase errors falls within a third phase error range different from both of the first and second phase error ranges.

In a further aspect, the feed-forward path is configured to reduce the HFPNC corresponding to each sample based on a moving average of the phase errors respectively corresponding to a predetermined number of the samples.

In a further aspect, the circuit is implemented as an application-specific integrated circuit or on a field-programmable gate array. In one embodiment the circuit is implemented as part of a larger receiver design.

In another aspect, a method for reducing phase errors in a phase-shift keyed or quadrature amplitude modulated communications signal is provided. In the method, a plurality of samples are generated from the signal. For each sample, a corresponding phase error is determined. An HFPNC of the phase errors or an LFPNC of the phase errors are selectively reduced in the signal based on a respective magnitude of the phase error when operating in a decision-directed mode.

In a further aspect, each sample is either a payload sample or a non-payload sample. The phase error corresponding to each of the payload samples is estimated in the decision-directed mode. The phase error corresponding to each of the non-payload samples is determined in a data-directed mode.

In a further aspect, the LFPNC is modeled as a random-walk process. In an aspect, step sizes in the random-walk process are kept at a minimum when based on phase errors corresponding to payload samples, and the step sizes are decreased from a maximum when based on phase errors corresponding to at least a subset of non-payload samples.

In a further aspect, a gain of the signal is adjusted based on a measured magnitude of at least one of the non-payload samples. In an aspect, the gain of the signal is adjusted in step sizes, wherein for at least one packet in the signal the step sizes are maximized for at least one initial non-payload sample in the packet, and wherein the step sizes are minimized for a first payload sample and all follow samples in the packet.

In a further aspect, when operating in the decision-directed mode, the HFPNC or the LFPNC are selectively reduced based a preconfigured decision map. In an aspect, when the respective magnitude of the phase errors falls within a first phase error range, only the step of reducing in the HFPNC is performed. When the respective magnitude of the phase errors falls within a second phase error range different from the first phase error range, both the step of reducing in the HFPNC and the step of reducing in the LFPNC are performed. When the respective magnitude of the phase errors falls within a third phase error range different from both of the first and second phase error ranges, neither the step of reducing in the HFPNC nor the step of reducing in the LFPNC is performed. In an aspect, a magnitude of any phase error in the third phase error range is greater than a magnitude of any phase error in the second phase error range, and a magnitude of any phase error in the second phase error range is greater than a magnitude of any phase error in the first phase error range.

In a further aspect, the step of reducing in the signal the HFPNC corresponding to at least one of the samples comprises reducing the HFPNC corresponding to each one of a plurality of the samples based on a moving average of the respective phase errors of a predetermined number of the samples.

In another aspect, a computer program product comprising a computer-readable memory containing instructions executable by a computer to perform the above method is provided.

In a further embodiment, a hardware description language (HDL) program is provided for an application specific integrated circuit (ASIC) and/or field programmable gate array (FPGA) implementation of the above method.

Figure 6:
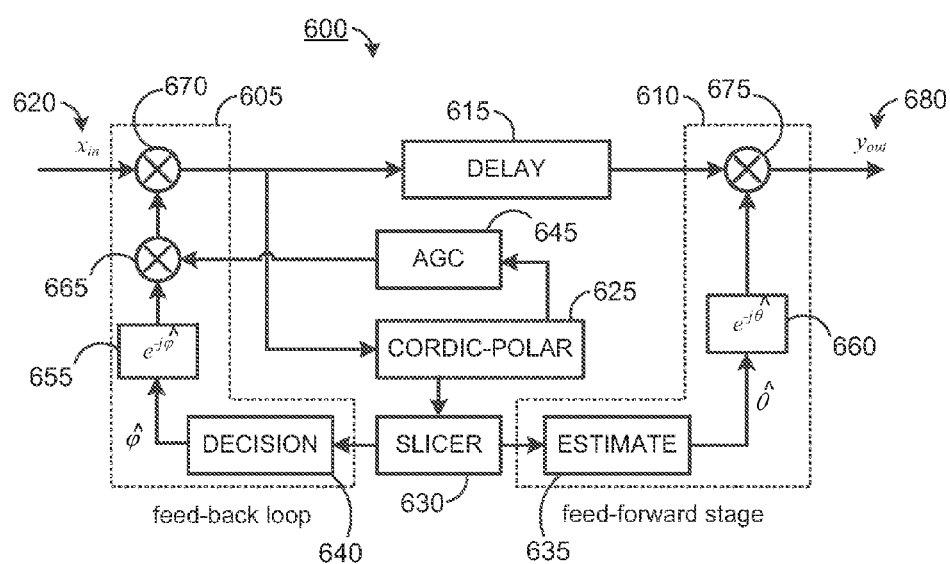
FIG. 6 shows a simplified schematic diagram of an embodiment of an automatic gain and phase control (AGPC) block.

FIG. 6 shows a simplified schematic diagram of an embodiment of the AGPC 600 illustrating the basic principles behind the phase noise estimation and compensation scheme.

The AGPC 600 includes a feed-back loop 605 and a feed-forward stage 610. The feed-back loop 605 provides compensation for average rotation due to LFPNC and adjusts the signal amplitude. Without limiting the generality thereof, the feed-back loop 605 of the AGPC block may be considered in one aspect to operate similarly to a combination of a DPLL and an automatic gain control (AGC) block. For the feed-forward stage 610 of the AGPC block the signal is delayed by means of the DELAY block 615 until an accurate estimation of the HFPNC for the data samples in each clock cycle is obtained. The length of the delay is predetermined based on the known latencies of the components. The estimated HFPNC is then removed from the data samples.

Figure 7:
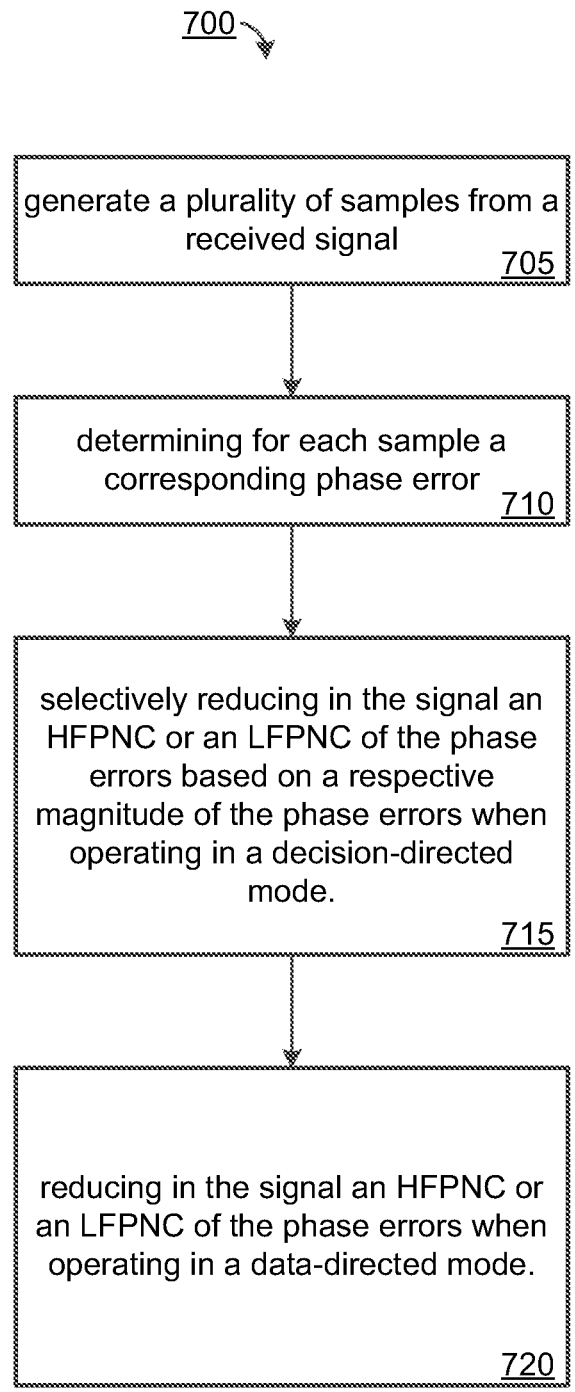
FIG. 7 shows a flowchart illustrating a method for reducing phase error in a telecommunication signal.

Operation of the AGPC 600 is now described with reference to FIG. 6. A related method 700 for phase control in a digital communications signal is shown in FIG. 7.

A received signal $x_{in}$ 620 is processed by the CORDIC-POLAR block 625 measuring the phase and amplitude of samples in the signal, thereby generating a plurality of phase samples from the received signal (step 705). In a system receiving N samples in each clock cycle, the CORDIC-POLAR block 625 measures the phase and amplitude for the N samples in each clock cycle. The SLICER block 630 then estimates the phase error for each of the N samples (step 710). It will be understood that the SLICER 630 is a hard decision demodulator similar to such as is known in the art which performs demodulation and error estimation, that is it identifies the constellation point indicated by the received sample and also determines the phase error by reference to the determined constellation point.

The phase error estimation performed by the SLICER block 630 may be either data-directed or decision-directed.

Data-directed phase error estimation requires prior knowledge of the transmitted sequence which may be available in headers, pilot symbols, or guard intervals. This method provides more accurate estimates of the phase error since the estimate is only affected by channel noise.

Blind, or decision-directed, phase error estimation, on the other hand, requires estimating what symbol was transmitted first, and then based on the estimated symbol, or decision, estimating the phase noise.

The SLICER 630 will perform data-directed or decision-directed estimation on a given received sample depending on whether the sample is a data, or payload symbol, or is instead a non-payload sample such as a pilot sample or a guard interval (GI) sample.

Figure 9:
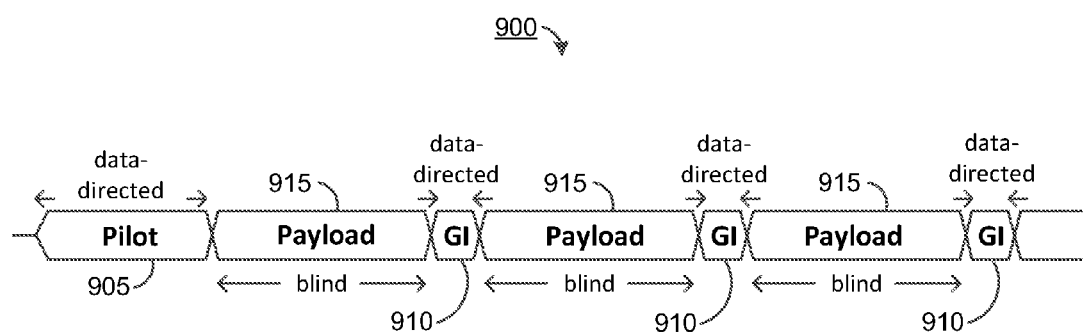
FIG. 9 shows a simplified schematic of a data packet structure illustrating a feed-back phase adjustment gear-shifting algorithm.

In this connection, it will be appreciated that each sample will be accompanied by a descriptor, and thus the performance by the SLICER 630 of data-directed or decision-directed estimation may vary from sample-to-sample. Typically, however, as shown in FIG. 9 and discussed below, a predetermined number of pilot symbols will be followed by a predetermined number of data, or payload samples, a predetermined number of GI samples, and a number of repetitions of the latter two, in accordance with a standard. In any event, however, the SLICER performs either data-directed or decision-directed estimation based on the sample descriptor.

In data-directed mode, therefore, the SLICER 630 will know what the transmitted symbols are. In such case, it calculates the phase error as being the received phase less the transmitted phase and sends the phase error value to both feed-back loop 605 and the feed-forward stage 610. Thus, in data-directed mode, the HFPNC and the LFPNC are both reduced in the signal (step 720).

Blind phase error estimation provides inferior estimation accuracy as it is affected not only by channel noise, but is affected also by symbol estimation error. Although blind phase error estimation can be erroneous, in high phase noise scenarios, where the degree of oscillator drift is obvious, it may be useful to incorporate its estimates for compensating phase noise. Blind phase error estimation suffers from inherent estimation error and sensitivity to channel noise, however, especially in low SNRs.

In decision-directed mode, the SLICER 630 estimates the transmitted symbols, and calculates the phase error as being the received phase less the estimated transmitted phase. The SLICER block 630 may be configured to feed these phase error estimations to only the feed-forward stage 610, or alternatively to both the feed-forward stage 610 and the feed-back loop 605, based on a preconfigured decision map 800 such as the decision map shown in FIG. 8. The decision map 800 shown in FIG. 8 pertains to binary phase-shift keying for the sake of clarity of illustration, but it will be appreciated that a decision map applicable to QPSK or to any other modulation scheme may be preconfigured and used based on the same principles.

Thus, in one embodiment, when in decision-direct mode, if the phase error is within a "feed-forward only" zone 805 the SLICER 630 sends the phase error estimate to the feed-forward stage 610, and sends 0 to the feed-back loop 605. If the phase error estimate is within the "feed-back+feed-forward" zone 810, the SLICER 630 sends the phase error estimate to both the feed-back loop 605 and the feed-forward stage 610. If the phase error falls outside of both the "feed-forward only" zone 805 and the "feed-back+feed-forward" zone 810, and is in a "dead-zone" 815, the SLICER 630 sends 0 to both feed-back loop 605 and the feed-forward stage 610. Thus, based on the respective magnitude of the phase errors, the AGPC selectively reduces in the signal an HFPNC or an LFPNC (step 715).

In order to reduce the inordinate effect of anomalous channel noise on phase error estimation, a dead-zone region 815 is included in the SLICER block decision map 800 that discards the input sample if the phase error is above a certain limit. Moreover, in the feed-forward stage 610, the measured phase error estimations from the SLICER block 630 may be averaged or processed in the ESTIMATE block 635 to obtain more accurate estimations of the HFPNC. For example, the ESTIMATE block 635 may be configured to determine a moving average of the phase error estimations received from the SLICER block 630. In one embodiment, the moving average may be based on a window of samples over three cycles centered on the current sample.

The feed-back loop 605 is operated as follows. Based on the valid assumption that phase noise behaves like a random-walk process, the feed-back phase value is modeled in the DECISION block 640 as a random walk process which is updated whenever the phase error passes a certain level.

While operating in the blind phase noise reduction mode, when the estimated phase error is small (shown as feed-forward only zone 805 in FIG. 8), it is assumed that the phase error is due to phase noise only and the AGPC block 600 tries to compensate with the feed-forward stage 610. When the estimated phase error passes a certain limit (shown as feed-back+feed-forward zone 810 in FIG. 8), the AGPC block 600 assumes that in addition to phase noise, the received signal is also affected by residual frequency offset (oscillator drift), hence the DECISION block 640 updates the feed-back value in the correct direction (as a random-walk process).

Thus, in one embodiment, the phase error values from the SLICER block 630 are first averaged in the DECISION block 640 (in one embodiment, over a window of 8 values in decision-directed mode, for example) to reduce the effect of channel noise. Based on the resulting phase error average, the DECISION block 640 decides how to update the random-walk process that estimates residual frequency-offset and low frequency phase noise (or LFPNC). The direction of the walk (positive or negative addition to the feed-back phase) is a function of the sign of the phase error average, while the step-size of the added/subtracted value depends on which gear the DECISION block 640 is operating (gear-shifting is discussed further below).

Moreover, in one embodiment the DECISION block 640 is configured to find an initial estimate for the feed-back phase by averaging a larger window (32 samples in one embodiment) of phase error samples in data-directed mode.

Figure 8:
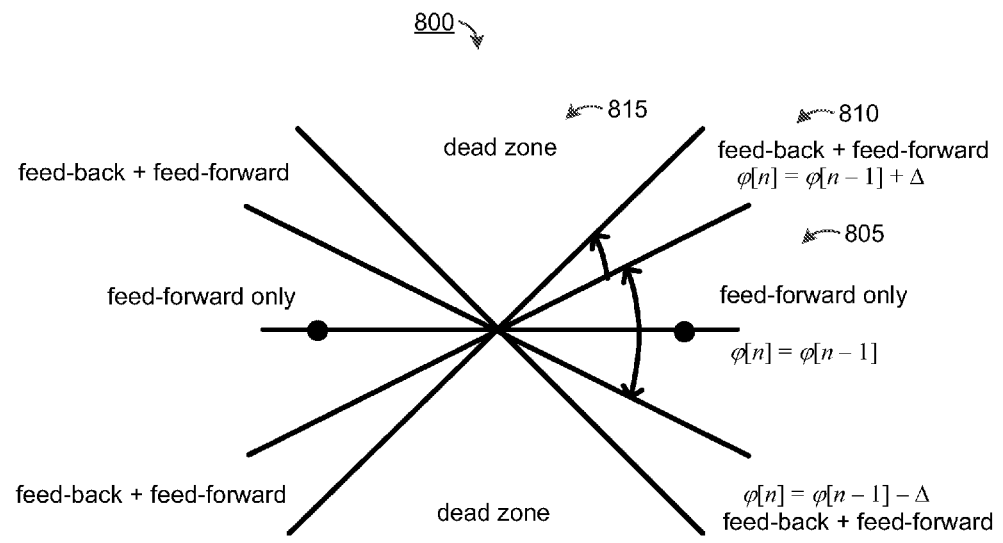
FIG. 8 shows a decision map illustrating an aspect of the functionality of the SLICER in blind, decision-directed estimation mode.

High levels of phase error, shown as dead-zone 815 in FIG. 8, are ignored by both the feed-back loop 605 and the feed-forward stage 610 in decision-directed mode as they are more likely to have been affected by channel noise and decision errors. The border limits between the above zones 805, 810, 815, the feed-back random-walk behavior, and feed-forward filtering are parameterizable based on the system specifications, channel model, and phase noise characteristics.

When the AGPC block 600 is operating in data-directed mode, the only source of error is the channel noise and therefore the entire value of the estimated phase error can be used for training the feed-back loop 605. However, in one embodiment, to improve the accuracy of the AGPC block 600, the measured phases are windowed (averaged over a window of samples) before being used by the feed-back loop 605 to reduce the channel noise effects. Moreover, a gear-shifting scheme is used for adjusting the feed-back phase. For the initial values, the feed-back phase is approximated directly by the measured phase errors, but as the estimated phase error improves (more filtered samples arrive), the gear is adjusted accordingly to fine-tune the estimated phase. By adjusting the gear-shifting and windowing, the estimated feed-back phase can converge to its optimal value in the shortest time.

For the purpose of illustrating a feed-back phase adjustment gear-shifting algorithm, a typical data packet structure 900 in wireless communications is illustrated in FIG. 9. A pilot section 905 precedes data transmission and guard intervals (GI) 910 separate individual data payloads 915. The pilot 905 and GI sections 910 (sequences known to the receiver), have several uses including on-the-fly estimation of channel conditions. In the AGPC block 600, the pilot 905 and GI sections 910 are used for faster acquisition of the phase and gain error and also for more accurate tracking in data-directed mode.

At the beginning of the pilot symbols, the DECISION block 610 in FIG. 6 makes an initial estimate of feed-back phase by averaging a window of phase errors (typically 32 samples). After the initial estimate of the feed-back phase, the step-size of the random-walk is set to its maximum. As more pilot samples are received and the feed-back phase estimates become more refined, the step-size of the random-walk process is reduced to provide even more accurate feed-back phase estimates. The step-size of the random-walk process reaches its minimum gradually by the end of the pilot symbols and remains at its minimum during the payload. When the first samples of the GI arrive, the step-size of the random-walk process is increased to speed-up the re-acquisition of feed-back phase error. Here again the step-size drops to its minimum on the course of the GI samples.

In one embodiment, the automatic gain control circuit (AGC) 645 shown in FIG. 6 is active only during the data-directed mode. In the first step of acquisition, the feed-back gain is initialized by a look-up table based on the input amplitude. The gain estimation is further improved as more samples arrive. A gain control gear-shifting mechanism is utilized for fast and accurate acquisition, tracking and compensation for the input signal amplitude.

Gear-shifting for the gain-estimation circuit works similarly to that of the feed-back phase estimation circuit. At the beginning of the pilot samples, the magnitude of the received samples is averaged for reducing the effects of channel noise. The estimated average magnitude is then inverted using a look-up table for faster acquisition. The step-size of the gear-shifting algorithm is then set to its maximum for faster tuning. The step-size of the algorithm drops gradually until the end of the pilot symbols where it reaches its minimum. A difference in one embodiment between the gear shifting algorithms between gain and feed-back phase compensation is that in the gain compensation circuit, the step-size of the gear-shifting algorithm does not increase during the rest of the packet as the gain estimate does not change drastically during the course of a packet.

The respective phase values output by the DECISION 640 and ESTIMATE 635 blocks, generated as described above, are received by respective digital oscillators 655, 660. The feed-back oscillator 655 outputs a signal to a complex multiplier 665 which also receives a signal from the AGC 645. The output of the complex multiplier 665 is received by a further complex multiplier 670 which also receives the received signal $x_{in}$ 620 and thus modifies it as described above. In this way, the feed-back loop 605 and the AGC 645 reduce in the signal a frequency offset component of the phase errors (or LFPNC) corresponding to the received samples and correct the magnitude of the received samples. Similarly, the signal output by the feed-forward oscillator 660 is received by a complex multiplier 675 which also receives the output of the DELAY block 615, to thereby produce an output signal $y_{out}$ 680. In this way, the feed-forward loop 610 reduces in the signal a high frequency phase noise component (or HFPNC) of the phase errors corresponding to the received samples.

Figure 10:
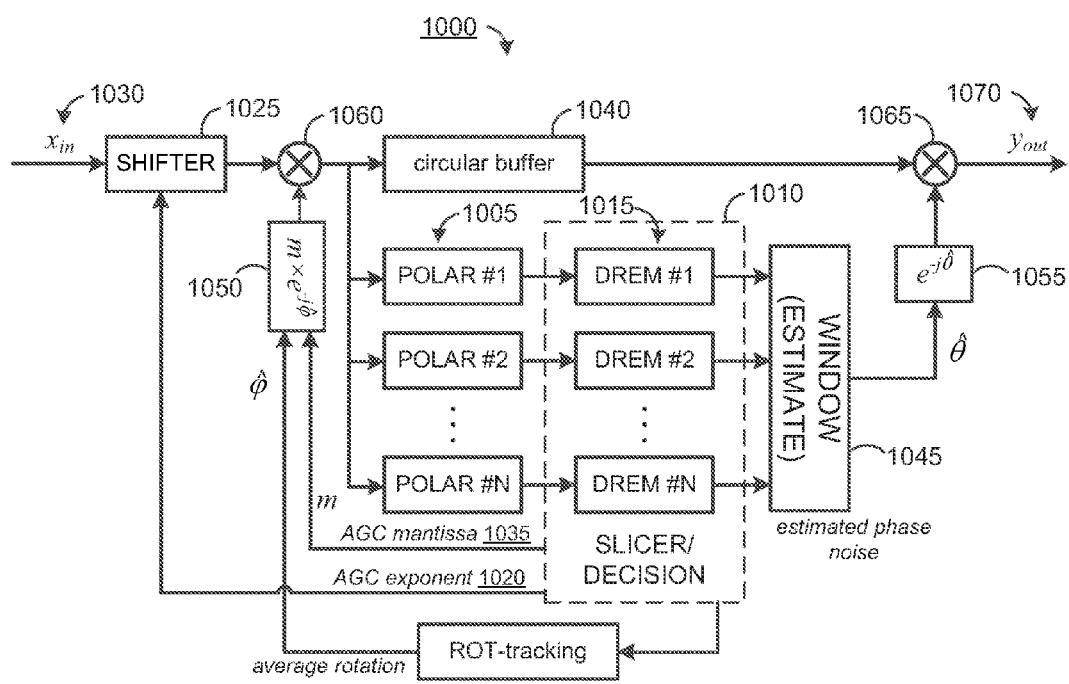
FIG. 10 shows a simplified schematic diagram of one implementation of the AGPC block of FIG. 6.
Figure 12:
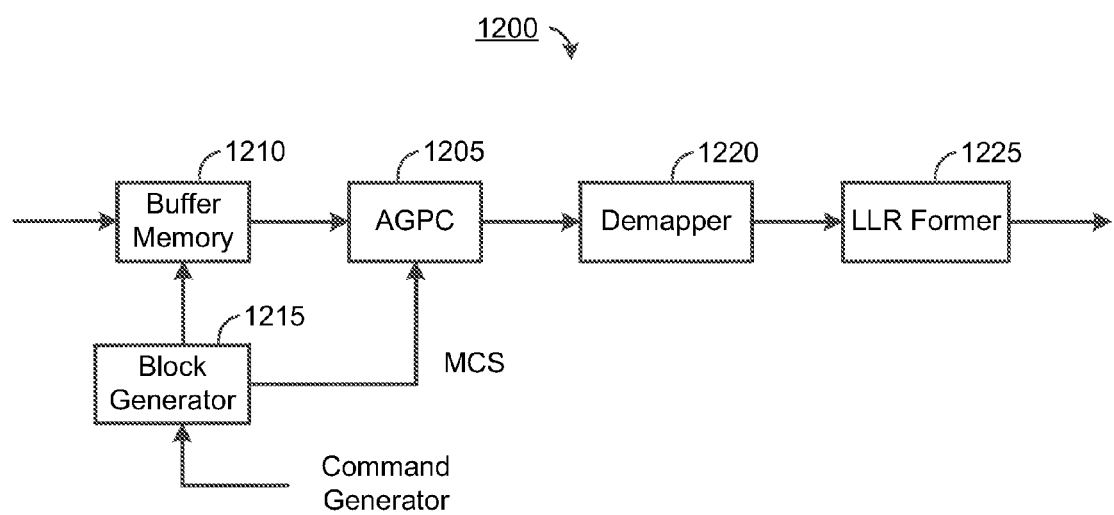
FIG. 12 shows a simplified schematic diagram of a WiGig receiver circuit employing an AGPC block.

A specific embodiment of an AGPC block 1000 is shown in FIG. 10. This AGPC block 1000 may be incorporated in an implementation of an IEEE 802.11ad (WiGig) receiver with N=8 samples per clock data rate. Parts of such a receiver 1200 are shown in FIG. 12 and discussed further below.

By way of comparison, it is noted that FIG. 6 illustrates the functionality of an AGPC 600 in a basic form. As in the case of the embodiment shown in FIG. 10, this functionality may be implemented in different ways and including wherein certain functionality is performed by a number of elements together.

In FIG. 10, a number N of POLAR blocks 1005 each similar to the CORDIC-POLAR block 625 from FIG. 6 are provided (N=8 in an embodiment) to emphasize that N samples arrive and are processed at the same time. A SLICER/DECISION block 1010 is provided having functionality similar to a combination of the respective functionalities of the SLICER 630 and DECISION 640 blocks in FIG. 6. In this case, N DREM (Data-Removal) blocks 1015 in the SLICER/DECISION block 1010 estimate the phases and make decisions (region-based) for each of the N streams.

Functionality similar to the of the AGC block 645 and associated feedback loop in FIG. 6 may in the embodiment 1000 in FIG. 10 also be implemented in the SLICER/DECISION block 1010, and in one embodiment may be implemented in floating-point format for greater accuracy. To reduce hardware complexity and multiplier latency, the exponent of the feedback AGC 1020 is passed to a shifter 1025 and thus is applied to the input signal 1030 for partly correcting the signal magnitude. Thus, in one embodiment, the gain compensation value is presented in two parts: 1) AGC-mantissa 1035 (combined with feed-back phase estimate and applied to the input samples); and 2) AGC-exponent 1020, applied directly to the input samples 1030 at the SHIFTER 1025 which can be represented as exponent*$2^{mantissa}$ which is the floating-point presentation. This implementation increases the accuracy/speed and reduces hardware area.

In the embodiment shown in FIG. 10, and with reference to FIG. 6, a circular buffer 1040 is provided having functionality similar to the DELAY block 615, a WINDOW (ESTIMATE) block 1045 provides functionality similar to the ESTIMATE 635 block, oscillators 1050, 1055 provide functionality similar to oscillators 655, 660, and complex multipliers 1060, 1065 provide functionality similar to complex multipliers 670, 675. Finally, the circuit 1000 outputs an output signal 1070 similar to output signal 680.

Figure 11:
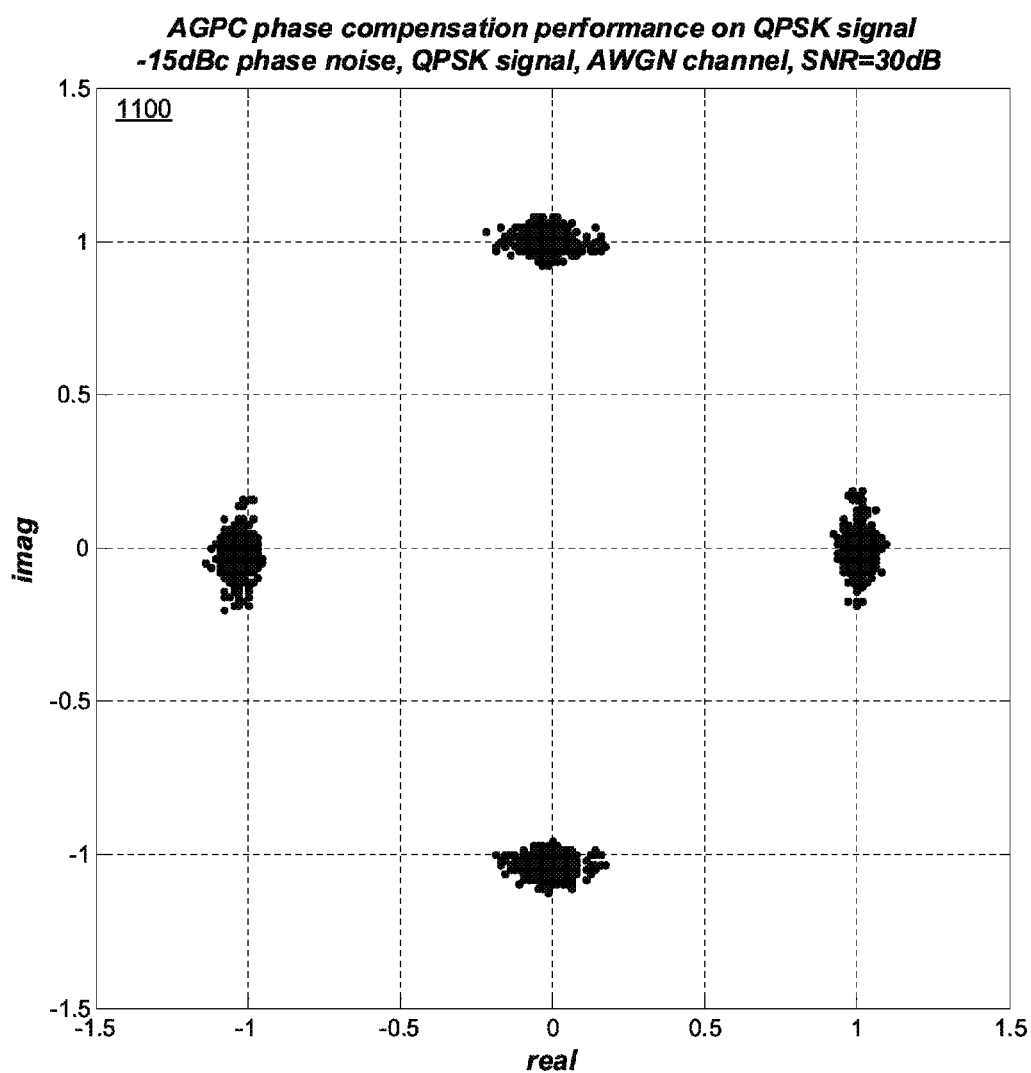
FIG. 11 shows a constellation diagram illustrating the relative compensation performance on a QPSK signal of the AGPC block implementation shown in FIG. 10.

FIG. 11 shows a constellation diagram 1100 illustrating the effectiveness of the AGPC block 1000 in the presence of strong phase noise (-15 dBc). The loop delay of the implemented circuit 1000 in FIG. 10 is 8*8=64 samples. Although the implemented AGPC 1000 has longer loop delay and adds gain recovery functionality, its performance is better than a traditional DPLL. Moreover, the AGPC block 1000 can be trained quickly with its fast gain and phase acquisition and gear-shifting techniques, a capability that is missing in traditional DPLLs.

FIG. 12 shows a partial embodiment of an IEEE 802.11ad receiver 1200 incorporating an AGPC block 1205 which may be any embodiment of the circuits 600 or 1000. The receiver may be an IEEE 802.11 ad (WiGig) receiver targeted for ASIC fabrication. The IEEE 802.11ad targets the 60 GHz ISM band and is capable of transmitting up to 7 Gbps of data.

With reference to FIG. 12, the received samples are stored in the buffer memory 1210 after timing recovery and equalization. The block generator 1215 passes the received samples to the AGPC block 1205 and provides the necessary training and control sequences. Thus, the block generator 1215 at each clock cycle tells the AGPC 1205 which samples are pilot, GI, or payload samples (as shown in FIG. 9). The output samples of the AGPC block 1205, now with correct phase and amplitude information, are passed to the demapper 1220 and LLR (log likelihood ratio) blocks 1225 for reliable estimation of the sample likelihoods before being decoded, wherein in one embodiment the LDPC decoder in the WiGig receiver uses LLR values to find the transmitted bits.

It will be understood by persons of ordinary skill in the art that the term "block" includes reference to circuit and/or software (machine-readable code) structures that cooperate so as to provide means for performing a specified function or action. For example, the designation "AGPC block", or "AGPC", indicates those circuit and/or software components which together perform the functionality described herein.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in simplified schematic diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

Embodiments of the invention can be implemented in an application-specific integrated circuit (ASIC) or in a field-programmable gate array (FPGA). Other embodiments which are hardware-only or a combination of hardware and software are also possible.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A circuit for reducing phase errors in a digitally modulated communications signal, the circuit comprising:
    a demodulator block for generating a plurality of samples from the signal and determining for each sample a corresponding phase error;
    a feed-forward path configured to reduce in the signal a high frequency component of the phase errors;
    a feed-back path configured to reduce in the signal a low frequency component of the phase errors; and
    a slicer for selectively forwarding phase errors to the feed-forward path or the feed-back path based on a respective magnitude of the phase error when operating in a decision-directed mode,
    wherein each sample is either a payload sample or a non-payload sample, wherein the demodulator block determines the phase error corresponding to each of the payload samples in the decision-directed mode, and wherein the demodulator block determines the phase error corresponding to each of the non-payload samples in a data-directed mode,
    wherein the feed-back path is configured to model the low frequency component as a random-walk process, and
    wherein step sizes in the random-walk process are minimized or kept at a minimum when based on phase errors corresponding to payload samples, and wherein the step sizes are decreased from a maximum to a minimum when based on phase errors corresponding to at least a subset of non-payload samples.

2. A circuit for reducing phase errors in a digitally modulated communications signal, the circuit comprising:
    a demodulator block for generating a plurality of samples from the signal and determining for each sample a corresponding phase error;
    a feed-forward path configured to reduce in the signal a high frequency component of the phase errors;
    a feed-back path configured to reduce in the signal a low frequency component of the phase errors; and
    a slicer for selectively forwarding phase errors to the feed-forward path or the feed-back path based on a respective magnitude of the phase error when operating in a decision-directed mode,
    wherein each sample is either a payload sample or a non-payload sample, wherein the demodulator block determines the phase error corresponding to each of the payload samples in the decision-directed mode, and wherein the demodulator block determines the phase error corresponding to each of the non-payload samples in a data-directed mode,
    wherein the demodulator block is further configured to adjust a gain of the signal based on a measured magnitude of at least one of the non-payload samples, and
    wherein the demodulator block adjusts the gain of the signal in step sizes, wherein for at least one packet in the signal the step sizes are maximized for at least one initial non-payload sample in the packet, and wherein the step sizes are minimized for a first payload sample and all follow samples in the packet.

3. A circuit for reducing phase errors in a digitally modulated communications signal, the circuit comprising:
    a demodulator block for generating a plurality of samples from the signal and determining for each sample a corresponding phase error;
    a feed-forward path configured to reduce in the signal a high frequency component of the phase errors;
    a feed-back path configured to reduce in the signal a low frequency component of the phase errors; and
    a slicer for selectively forwarding phase errors to the feed-forward path or the feed-back path based on a respective magnitude of the phase error when operating in a decision-directed mode,
    wherein the slicer is configured selectively to forward phase errors to the feed-forward path or the feed-back path when operating in the decision-directed mode based on a preconfigured decision map, and
    wherein the slicer is configured to forward phase errors to the feed-forward path and to refrain from forwarding the phase errors to the feed-back path when the respective magnitude of the phase errors falls within a first phase error range, wherein the slicer is further configured to forward the phase errors to the feed-forward path and the feed-back path when the respective magnitude of the phase errors falls within a second phase error range different from the first phase error range, and wherein the slicer is further configured to refrain from forwarding the phase errors both to the feed-forward path and the feed-back path when the respective magnitude of the phase errors falls within a third phase error range different from both of the first and second phase error ranges.

* * * * *